Figure 4:
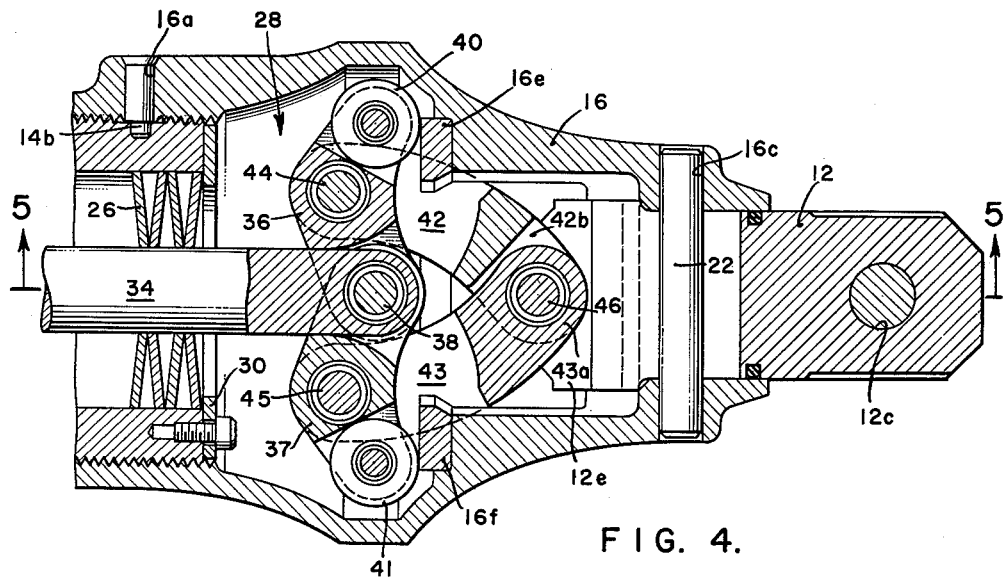

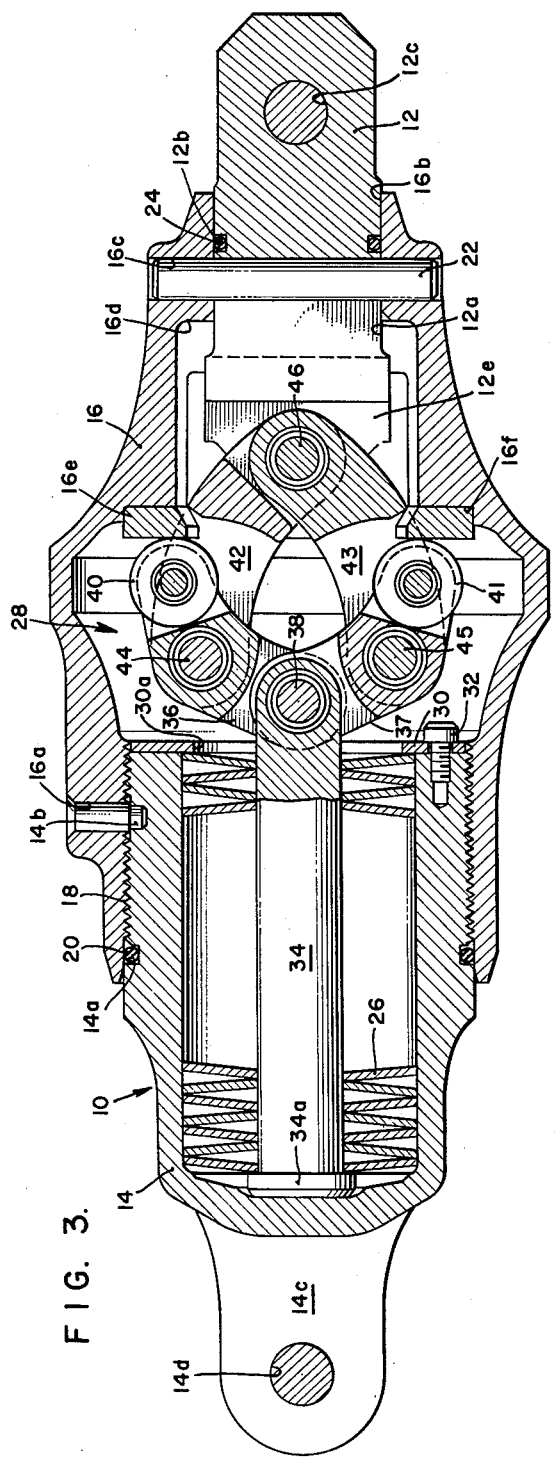

INVENTOR.
SIMON TAMNY
ATTORNEY.

United States Patent Office 3,082,733
Patented Mar. 26, 1963

3,082,733
OIL WELL LINE TENSIONING INDICATORS
Simon Tamny, Los Angeles, Calif., assignor to Borg-Warner Corporation, Chicago, Ill., a corporation of Illinois
Filed Feb. 29, 1960, Ser. No. 11,554
2 Claims. (Cl. 116—67)

This invention pertains generally to the field of indicators, but more particularly to devices for signaling the occurrence of a predetermined force.

Although certainly not limited thereto, the present invention is particularly well suited for use in the drilling of oil wells where it is desirable, if not necessary, to afford indication of the occurrence of a predetermined force in certain of the lines used in the drilling operation. For instance, in making up or taking apart sections of drill pipe, it is common practice to employ a tong, which, for the sake of the present discussion, may be considered to be a large though specially constructed pipe wrench. Used in cooperation with such a tong, is a back-up tong which is connected to a stationary member on the drill rig and which is of construction similar to that of the above-mentioned tong. In order to make up or take apart sections of drill pipe, such tongs are used as opposing pipe wrenches to firmly tighten or loosen the threaded connections. To prevent damaging of the threads during make-up, or ensuing fatigue failure during drilling, it is necessary to control the amount of torque applied to the connections. This is the responsibility of the drilling personnel, but to afford indication of the desired torque at the connection, a device capable of indicating the occurrence of a given force is operatively connected in the line which connects the back-up tong to the stationary member on the drill rig. Thus, whenever the indication or signal is given by the device, the operating personnel realize that the correct torque has been applied to the connection.

An object of the present invention is to provide a force indicating device which provides an audible signal upon the occurrence of a predetermined force.

Another object is to provide such an indicating device which comprises a pair of force-transmitting members which are normally biased to initial relative positions and are provided with oppositely disposed engageable surfaces which are abruptly brought together whenever such bias is overcome to thereby afford an audible signal.

Another object is to provide such an indicating device which utilizes a collapsible linkage mechanism responsive to occurrence of the predetermined force to substantially instantaneously overcome said bias so that the force-transmitting members are caused to be moved at a high rate of speed at impact of the surfaces, to thereby provide a loud signal.

Another object is to provide an indicating device as characterized above wherein the linkage mechanism is so constructed as to have a variable mechanical advantage which upon overcoming the biasing means increases at such a fast rate as to clearly overcome the spring rate of biasing means usually employed in such devices.

Another object is to provide an indicating device as characterized above which is automatically reset upon removal of the force.

Another object is to provide such a device which is particularly characterized by being simple in construction, inexpensive to build, and extremely rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which, FIG. 1 is a schematic drawing of reduced scale showing the position of the various parts of the linkage mechanism before the indicating device is tripped.

Figure 5:
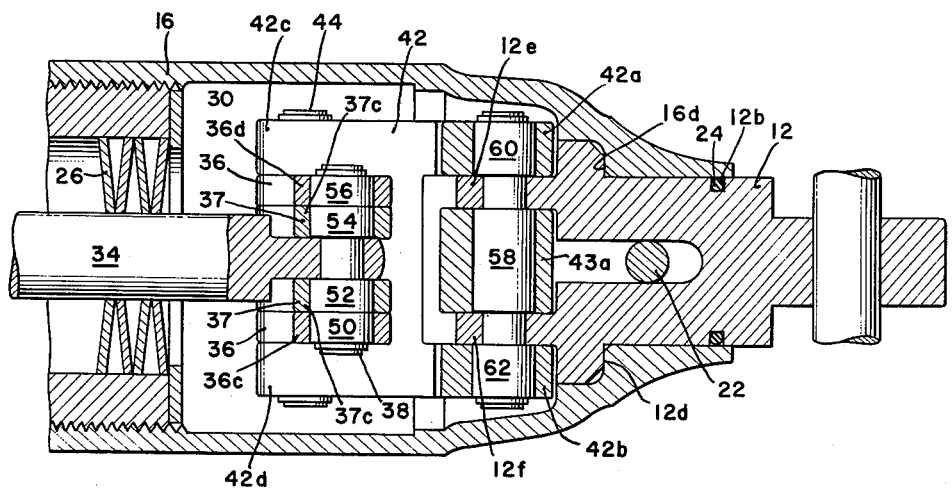

FIG. 2 is a schematic drawing of reduced scale showing the position of the various parts of the linkage mechanism after the indicating device has tripped, FIG. 3 is an axial sectional view through an indicating device embodying the instant invention, the various parts being shown in their positions before the device is tripped, FIG. 4 is a fragmentary axial sectional view of the device of FIG. 3 showing the various parts in their positions after the device is tripped, FIG. 5 is a fragmentary axial sectional view taken substantially along line 5—5 of FIG. 4, FIGS. 6, 7 and 8 are front, bottom and rear elevational views respectively of the linkage mechanism (without its housing for the sake of clarity) before the device is tripped.

Like reference characters indicate corresponding parts throughout the several views of the drawings.

Referring to FIG. 3 of the drawings, the embodiment chosen for illustration of the present invention comprises a pair of relatively movable force-transmitting members 10 and 12. Member 10 comprises a pair of generally cup-shaped housing members 14 and 16 which are adjustably fastened together by threads as at 18 to provide a substantially unitary housing. Member 14 is formed with an annular groove 14a wherein is positioned an O-ring 20 which cooperates with housing members 14 and 16 to effectively hermetically seal the threaded connection therebetween. There is also provided a lock screw which is fastened within an opening 16a formed in housing member 16 and which cooperates with groove 14b formed in housing member 14. Housing member 14 is further provided with a connecting lug 14c wherein a through opening 14d is provided to facilitate connection of the indicating device to one side of a line.

Housing member 16 is provided with an opening 16b wherein is slidably positioned force-transmitting member 12. Member 12 is provided with a slot or cutout 12a (also FIG. 5) which effectively bifurcates one end of member 12 thereby providing separate bearing portions 12e and 12f. A pin 22 which firmly seats within openings 16c formed in housing member 16 extends through slot 12a and limits the travel of force-transmitting member 12 as will hereinafter become apparent. Member 12 is provided with an annular groove 12b wherein is positioned an O-ring 24 which operates to hermetically seal the engagement between members 12 and 16. Force-transmitting member 12 is further formed with a through opening 12c to facilitate connection of the device to a line.

Member 12 is formed with a shoulder 12d (shown most clearly in FIG. 5) for engagement with a shoulder 16d formed in housing member 16 to effect the desired audible signal upon occurrence of the predetermined force, as will become apparent as the description proceeds.

Within the cavity afforded by the aforedescribed interconnection of cup shaped members 14 and 16 are biasing means 26 and a linkage mechanism 28 which effectively interconnect force-transmitting members 10 and 12. A retaining plate 30 is fastened to one end of housing member 14 by means of screws 32. Positioned within housing member 14 and extending through a large opening 30a formed in retaining plate 30 is a shaft or pin 34 which is provided with an enlarged end portion or head 34a. Biasing means 26 is positioned within housing member 14 such that one end thereof abuts against retaining plate 30 while the other end thereof engages head 34a of pin 34. Biasing means 26 is in the form of a compression spring and may be an ordinary helical wire spring or it may be a Belleville spring composed of a plurality of individual spring segments as shown in FIG. 3.

Linkage mechanism 28 is of the type commonly referred to as a collapsible linkage in that it is characterized by having a variable mechanical advantage which upon initial movement of the linkage, increases at an increasing rate such that the linkage is caused to collapse substantially instantaneously. Reference will now be made to FIGS. 1 and 2 which are schematic showings of the linkage 28 of the preferred embodiment. The reference characters used in FIGS. 1 and 2 are in the one hundred series of numbers, but except for the number designating such series, corresponding reference characters have been used to identify similar parts in FIGS. 1 and 2 and the remaining figures of the drawings.

FIG. 1 shows the indicating device in its reset position prior to occurrence of the maximum force to be indicated. The device of FIG. 1 is connected in a line by means of openings 114d and 112c which are provided to facilitate connection of the opposite sides of the indicating device to contiguous sections of the line.

As long as the tensile force in the line does not exceed the predetermined value for which the indicating device is set, as determined by the strength of the compression spring 126 and the degree of interconnection of housing members 114 and 116 as will be hereinafter explained in greater detail, the compression spring 126 retains shaft 134 in such position that head 134a thereof abuts against the closed end of housing member 114, as shown in FIG. 1. Under these conditions, force-transmitting member 112 is retained in its extreme left position due to the action of linkage mechanism 128. Housing member 116 is provided with a pair of oppositely disposed platforms or ledges 116e and 116f which extend transversely of the direction of the tensile force being applied to the indicating device.

Linkage mechanism 128 comprises a pair of pivotal levers 136 and 137, one end of each of which is connected to shaft 134 by means of a pivot pin 138. The other ends of pivotal levers 136 and 137 are provided with movable pivot points as by means of individual rollers 140 and 141 which engage respectively ledges 116e and 116f and are movable thereon within housing member 116.

Intermediate the ends of pivotal levers 136 and 137 are respectively fastened one end of connecting levers 142 and 143 as by means of pivot pins 144 and 145 respectively, the opposite ends of such connecting levers being fastened by means of pivot pin 146 to force-transmitting member 112. Thus, with compression spring 126 retaining the head 134a of shaft 134 in abutting engagement with the closed end of housing member 114, pivot pin 138 of linkage mechanism 128 is urged such that the pivot points afforded by rollers 140 and 141 of levers 136 and 137 are in their reset positions close to the central axis of the device. As such, the shoulder 112d of member 112 is retained a predetermined distance from the shoulder 116d of housing member 116 by means of compression spring 126.

As the tensile force applied to the indicating device increases, the leverage mechanism remains in the position shown in FIG. 1 until the aforementioned predetermined maximum force is reached. Thereupon, such force, as transmitted from member 112 to spring 126 through linkage mechanism 128, becomes sufficient to overcome the compressive force of spring 126 thereby causing members 110 and 112 to move relative to each other against the force of such spring. As soon as such initial movement occurs, pivot pin 138 is caused to move toward force-transmitting member 112. This causes rollers 140 and 141 to move on their respective ledges 116e and 116f of housing member 116 so as to increase the distance between the movable pivot points of the levers 136 and 137. This causes the mechanical advantage of linkage mechanism 128 in transmitting the force on member 112 to spring 126 to increase so that a greater force is now applied to such spring as compared with the force which was initially applied thereto and which resulted in the initial relative movement of the force-transmitting members. This, of course, further overcomes the force of compression spring 126 so that pin 138 is caused to move even farther to the right as viewed in FIG. 1, whereupon the mechanical advantage of linkage mechanism 128 is further increased so as to further overcome the compressive force of spring 126.

The linkage mechanism of the preferred embodiment is such that upon initial relative movement of the force-transmitting members, the mechanical advantage of the linkage mechanism increases at a much faster rate than the rate of increase of the resisting force of springs normally used in such devices. In fact, the linkage mechanism 128 so dominates spring 126 that the latter is substantially instantaneously overcome or overpowered due to the substantially instantaneous collapse of such linkage mechanism. Because of this, force-transmitting member 112 is caused to move, under the influence of the external forces applied to the device, at a substantially high rate with respect to force-transmitting member 110 until shoulder 112d of member 112 sharply engages shoulder 116d of member 116 as shown in FIG. 2. The engagement of these shoulders provides a sharp report or signal to provide an audible indication of the occurrence of the predetermined maximum force.

Upon removal of the external forces acting on members 112 and 114, spring 126 returns the leverage mechanism of the indicating device from its tripped position to its reset position shown in FIG. 1. This is automatically accomplished since the force of compression spring 126 is never diminished but is merely overcome by the external forces applied to the device.

Returning now to the preferred embodiment shown in FIGS. 3–8, inclusive, it will be noted that the ledges 16e and 16f within housing member 16 are separate inserts which are fastened to the member 16. This is particularly desirable so that the ledges may be hardened sufficiently to resist the wear incident to the periodic rolling of wheels 40 and 41 thereon.

Figure 6:
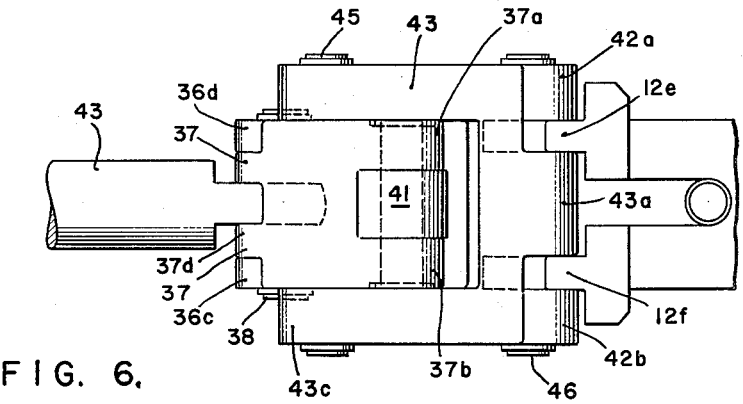
Figure 7:
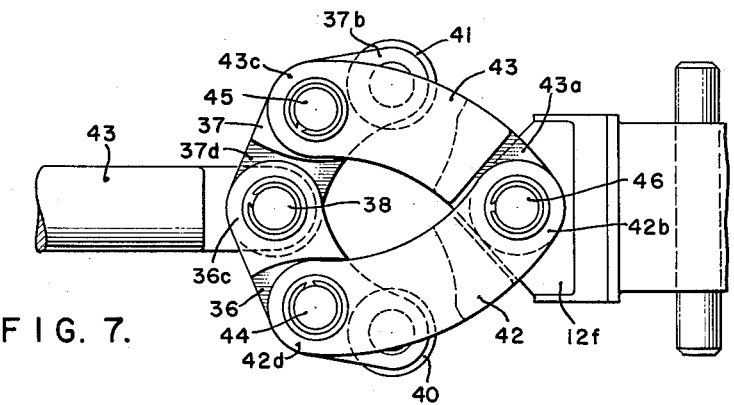
Figure 8:
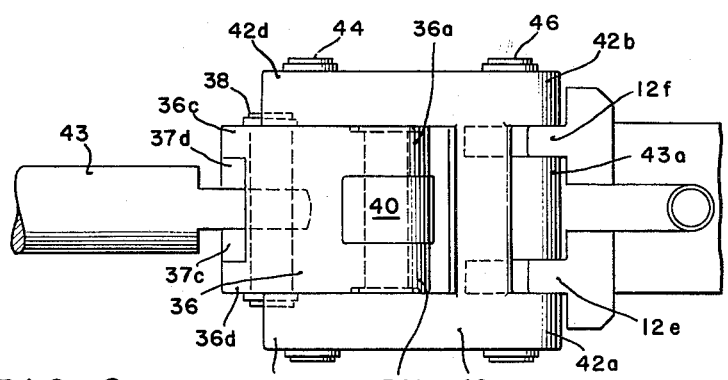

FIG. 3 shows the linkage mechanism 28 in its reset position corresponding to the showing in FIG. 1, whereas FIG. 4 shows such mechanism in its tripped position corresponding to that schematically shown in FIG. 2. As shown in FIG. 5, which is a sectional view taken along line 5—5 of FIG. 4, in the preferred form of the present invention the connecting lever 42 is generally H-shaped to provide a pair of spaced bearings at each end thereof (42a and 42b, and 42c and 42d). Pivotal lever 36, which cooperates with connecting lever 42 as shown in FIGS. 3 and 4, is also bifurcated at its opposite ends to provide bearing portions 36a, 36b, 36c and 36d (FIGS. 5 and 8). As most clearly shown in FIGS. 5 and 6, pivotal lever 37 is also provided with bifurcated opposite end portions to provide separate bearing portions 37a, 37b, 37c and 37d. FIG. 6 also shows that connecting lever 43 is formed such that one of its ends is provided with a single centrally located bearing portion 43a while its opposite end is divided into two bearing portions 43b and 43c.

When assembled, the bearing portions 37c and 37d of pivotal lever 37 are positioned on opposite sides of shaft 34 while the bearing portions 36c and 36d of pivotal lever 36 are positioned adjacent bearing portions 37d and 37c respectively, as shown most clearly in FIG. 5. While the levers 36 and 37 are so positioned, pin 38 is inserted as shown in FIG. 5, there being hardened bushings 50, 52, 54 and 56 between pin 38 and the associated bearing portions of levers 36 and 37.

In like manner, suitable hardened bushings are employed about pivot pins 44 and 45 to minimize the wear between the pivotal levers 36 and 37 and the respective connecting levers 42 and 43. Levers 42 and 43 are pivotally connected to force-transmitting member 12 by means of a pivot pin 46, the centrally located bearing portion 43a of lever 43 fitting within the space afforded by the bifurcated bearing portions 12e and 12f of member 12 while the bearing portions 42a and 42b of lever 42 are caused to engage the outer surfaces of bearing portions 12e and 12f as shown in FIG. 5. While levers 42 and 43 are in such positions, pin 46 is inserted as shown, there being hardened bushings 58, 60 and 62 about pin 46 as shown in FIG. 5.

As mentioned supra, compression spring 26 is retained within housing member 14 by means of retaining plate 30 and is unaffected by changes in the tripping force to which the device is set by virtue of the degree of engagement of housing members 14 and 16. That is, by changing the degree of engagement of housing members 14 and 16, such alteration changes the distance between the pivot points of the pivotal levers 36 and 37 thereby altering the mechanical advantage of the linkage mechanism 28 in transmitting the external force from member 12 to compression spring 26. Such change in mechanical advantage alters the tripping force of the device and can be greatly facilitated by the use of suitable indicia on housing member 14 immediately adjacent housing member 16.

In order to change the range of tripping forces, it is merely necessary to provide a spring 26 of the appropriate compressive force.

It is thus seen that the present invention provides a signalling device which is capable of providing an audible signal upon the occurrence of a predetermined force.

Although I have shown and described certain specific embodiments of my invention I am fully aware that many modifications thereof are possible. My invention, therefore, is not to be restricted except insofar as is necessitated by the prior art and by the spirit of the appended claims.

I claim:

1. In an indicating device having a pair of relatively movable members and biasing means for urging said members toward initial relative positions, the combination therewith, of a collapsible linkage mechanism responsive to the condition to be indicated to substantially instantaneously overcome said biasing means including means for progressively increasing mechanical advantage over said biasing means in response to said condition to thereby permit relative movement of said members to effect an indication, said means comprising a pivotal lever one end of which is operatively associated with the biasing means, a connecting lever one end of which is affixed intermediate the ends of said pivotal lever and the other end of which is fixed to one of said members.

2. In an indicating device having a pair of relatively movable members, biasing means urging said member toward initial relative positions, and indicating means operable in response to movement of said members from their said initial positions, the combination therewith, of a collapsible linkage mechanism responsive to the condition to be indicated to substantially instantaneously overcome said biasing means including means by which said biasing means is overcome by an increasing mechanical advantage at a rate faster than the rate that said biasing means increases its bias as said members move away from their initial positions to thereby permit relative movement of said members from their initial positions to effect operation of said indicating means, said means comprising a pair of pivotal levers one end of each of which is operatively associated with the biasing means while the other ends thereof are provided with movable pivot points, connecting levers one end of each of which is fixed intermediate the ends of said pivotal levers, the other ends of which connecting levers being fixed to said members.

References Cited in the file of this patent

UNITED STATES PATENTS

| | | |
|---|---|---|
| 2,664,845 | Rhodes et al. | Jan. 5, 1954 |
| 2,703,980 | Tell | Mar. 15, 1955 |

FOREIGN PATENTS

| | | |
|---|---|---|
| 333,313 | Germany | Feb. 22, 1921 |